(12) United States Patent
Sedlack (10) Patent No.: US 6,205,600 B1
(45) Date of Patent: Mar. 27, 2001

(54) CHILD RESTRAINT CAR BED

(75) Inventor: Mark A. Sedlack, Cuyahoga Falls, OH (US)

(73) Assignee: Graco Children's Products Inc., Elverson, PA (US)

( * ) Notice: Subject to any disclaimer, the term of this patent is extended or adjusted under 35 U.S.C. 154(b) by 0 days.

(21) Appl. No.: 08/962,131

(22) Filed: Oct. 31, 1997

(51) Int. Cl.⁷ ..................................................... A47D 7/04
(52) U.S. Cl. ................................. 5/94; 5/655; 297/250.1; 297/484; 297/256.13
(58) Field of Search .................................... 5/94, 95, 101, 5/2.1, 108, 655; 126/15; 297/464, 250, 216, 488, 219.11, 216.12, 250.1, 256.1, 256.15, 253

(56) References Cited

U.S. PATENT DOCUMENTS

| | | | |
|---|---|---|---|
| 311,822 | 11/1990 | Meeker | D6/333 |
| 325,132 | 4/1992 | Cone | D6/333 |
| 333,389 | 2/1993 | Saito, et al. | D6/356 |
| 3,054,637 | 9/1962 | Pambello | 297/4 |
| 3,115,364 | 12/1963 | Berlin | 297/130 |
| 3,323,147 | * 6/1967 | Van Dean | 5/94 |
| 3,334,944 | 8/1967 | Gould et al. | 297/377 |
| 3,409,325 | 11/1968 | Hamilton et al. | 297/377 |
| 3,659,865 | 5/1972 | Nothacker | 280/7.1 |
| 3,833,946 | * 9/1974 | Von Wimmersperg | 5/94 |
| 4,342,483 | * 9/1982 | Takadas | 297/488 |
| 4,371,206 | 2/1983 | Johnson, Jr. | 297/183 |
| 4,943,113 | 7/1990 | Meeker | 297/250 |
| 4,977,630 | * 12/1990 | Oswalt et al. | 5/655 |
| 5,005,234 | 4/1991 | Kelleher et al. | 5/94 |
| 5,092,004 | 3/1992 | Cone et al. | 5/94 |
| 5,098,161 | * 3/1992 | Minami et al. | 297/464 |
| 5,115,523 | * 5/1992 | Cone | 5/94 |
| 5,409,411 | * 4/1995 | Schrieber | 5/655 |
| 5,561,879 | * 10/1996 | Everall | 5/655 |
| 5,775,967 | 7/1998 | Lacoursiere et al. | 441/115 |
| 5,873,635 | * 2/1999 | Merrick | 297/484 |
| 5,964,502 | * 10/1999 | Stephens | 297/250.1 |

FOREIGN PATENT DOCUMENTS

| | | |
|---|---|---|
| 0 486 184 A1 | 5/1992 | (EP) . |
| 2 283 650 | 4/1976 | (FR) . |
| 2 642 963 | 8/1990 | (FR) . |

* cited by examiner

Primary Examiner—Terry Lee Melius
Assistant Examiner—Fredrick Conley
(74) Attorney, Agent, or Firm—Foley & Lardner (57) ABSTRACT

A child restraint car bed is disclosed comprising a shell body (12) including a chamber (5) sized to receive an infant; and first and second through-slots (44, 46) extending through the shell body and communicating with the chamber. A lower surface portion (42) of the first sidewall is concave to support an infant in an on-side position and the bottom chamber surface (40) is substantially planar to support the child in a supine position. A harness assembly (78) is further provided for engaging the shell body and includes retention straps (80, 82, 84) having hook and loop end portions (86, 92, 94) that extend through the through-slots (44, 46) and attach to an infant positioned within the chamber to fixedly secure the infant to the shell body. The harness assembly laterally moves within the through-slots (44, 46) into alternative locations to adjust to a variable body position assumed by an infant in the chamber. The shell body further includes a skirt flange (34) extending from proximate a top rim (38) along a first sidewall (14) and retention hooks (58, 68) positioned along the skirt flange to engage and retain a vehicle seat belt thereagainst.

28 Claims, 10 Drawing Sheets

CHILD RESTRAINT CAR BED

BACKGROUND OF THE INVENTION

1. Field of the Invention

The subject invention relates generally to devices for the transportation of infants and, more specifically, to car bed devices for the vehicular transportation of infants having special medical needs.

2. The Prior Art

The medical community has long recognized the unique transportation needs of low weight infants, particularly premature infants. The smaller size of the preterm infant and attendant risk of cardiorespiratory compromise have necessitated the development of alternative transportation devices.

Traditional devices, such as conventional rear facing child restraints (hereinafter referred to as "RF child restraints"), have been found deficient in meeting the unique needs of the premature infant because, in general, such conventional products are designed for a larger child. More particularly, a deficiency in conventional RF child restraints is because their use requires that the infant be placed in an upright or semi-upright position. Established medical opinion recommends transporting the preterm infant in a child restraint that allows for a prone or supine position.

A second deficiency in existing RF child restraints lies with the restraint systems or harness configurations used therein. Such restraint systems typically incorporate a buckle, clasp, or other rigid element as a connective device. The potential for harm to a smaller sized infant from confrontation against a buckle or a clasp is considerable.

Finally, commercially available RF child restraints are inadequate in meeting the needs of the preterm low weight infant in that they are not designed or recommended for use in a front seat environment. Because upright RF child restraints have a relatively high profile, its use on the front seat of a car carries a risk of injury to the child from the deployment of airbags. However, in the case of the premature infant, it is often necessary for the driver to maintain visual contact with the infant during transportation in order to monitor the infant's respiratory condition. This creates a safety dilemma, forcing a choice between the risk of injury to the child from deployment of the air bag against the risk of injury from placing the infant on the rear seat, out of visual contact with the driver.

The market has attempted to address the above-described needs of the premature infant by the development of car beds, designed to maintain a child in a prone or supine position within the vehicle. Such attempts to achieve an acceptable commercial product have only been partially successful. U.S. Pat. Nos. 5,115,523 and 5,092,004 teach an infant car bed that is representative of the state of the art. While the car bed described therein is an improvement over the use of conventional RF child restraints in that it allows the child to be positioned in a prone or supine position, it still does not represent an ideal solution to the needs of the preterm infant.

A first problem typlified by the product disclosed in the above-identified patents is that the car bed is designed to be convertible, providing both an upright RF child restraint or a reclining car bed. Such versatility, at first glance, may seem to be advantageous to the purchaser. However, incorporating convertibility adds considerably to the cost of the end product and results in a product that does not optimally meet the needs of the user in either of the two positions.

A second deficiency found in available car beds is that they are too large to fit a conventional front vehicle bucket seat and the face of an infant positioned therein is not readily visible to a driver. The opportunity to maintain visual surveillance is important in order to detect respiratory problems that may develop. A related deficiency in the state of the art car beds is that they provide inadequate ventilation to the child positioned therein.

Moreover, such car beds utilize harness mechanisms that incorporate the same deficiencies described above with respect to car seats, namely, a hard clasp or buckle is used that can harm the low weight infant. The performance of existing car beds in a collision can further be compromised because the attachment point of such car beds is not compatible with existing vehicle restraint belts. This can cause the bed to move forward to an unsafe degree when subject to the influence of impact forces. Another deficiency is that existing car beds have a generally perpendicular forward sidewall. In a crash, impact forces tend to force the child forward into the forward wall. The impact against a forward vertical wall can be traumatic.

Finally, while conventional car beds afford the user the option of placing the infant in either a prone or supine position, they do not offer a third option; that of positioning the child on one side. When under respiratory duress, it is often advantageous to transport a premature child on one side in order to free the chest area. However, placing a child in such a position in conventional car beds is not possible and can even be dangerous since such devices lack a restraint system for maintaining the infant in an on-side position.

SUMMARY OF THE INVENTION

The subject invention overcomes the aforementioned deficiencies in the state of the art car beds and provides a car bed optimally suited for premature or low birth weight infants. A car bed is disclosed having a low profile that precludes interaction with a deployed air bag and the car bed can thus be used safely on the front seat of a vehicle. Moreover, the bottom surface of the car bed inclines the infant from foot to head to enhance the observation angle between the infant and the driver.

The car bed comprises an integrally molded shell body having an outwardly radiussed outer sidewall defining an inner chamber that provides a strong impact absorbing surface. An outwardly flared dependent skirt flange extends from proximate an upper rim of the outer sidewall and defines a seat belt path across the front of the shell body. Seat belt retention hooks are formed to accept and position the seat belt of the car and establishes and maintains engagement between the shell body and the seat belt at a location above the center of gravity of the car bed. The skirt flange secondarily forms a handle for carrying the car bed and an inward depression in the opposite sidewall enables a user to position the car bed comfortably against the user's body during transport.

An internal chamber is provided within the shell body defined by a planar surface on the bottom and an inwardly concave surface across the outer sidewall. Accordingly, an infant may be positioned alternatively in the prone or supine positions on the planar bottom surface or on one side against the concave surface of the outer sidewall. The concave, inward facing forward surface dually functions as a transition surface in a collision by easing the infant in the chamber against the forward sidewall. Ventilation slots are formed through the shell body to adequately ventilate the chamber.

A harness assembly attaches to the shell body through parallel arcuate through-slots in the shell body. The through-slots extend along the bottom surface and upwardly across the concave surface of the outer sidewall. The harness assembly comprises a unitary Y-shaped strap having convergent shoulder straps and a crotch strap that feed through the through-slots and secure about an infant in the chamber. Free ends of the crotch and shoulder straps adjustably overlap and include contacting hook and loop surfaces. The harness assembly thereby adjusts to snugly restrain the infant without the use of clasps, buckles, or other hard elements. The crotch and shoulder straps move laterally within the arcuate through-slots to accommodate alternative body positions of the infant in the chamber. In each mode of adjustment, the harness assembly secures the infant against the shell body and maintains the child in the preferred body position.

Accordingly, it is an objective of the subject invention to provide a car bed capable of accommodating an infant therein in the supine, prone, or on-side positions.

A further objective is to provide a car bed that provides an adjustable restraint system that functions effectively to comfortably secure an infant in any alternative body position and that functions without buckles or other hard connection elements that could harm the infant.

Still another objective is to provide a car bed that is impact resistant and can be securely retained upon a vehicle seat by conventional seat belts.

An additional objective is to provide a shell body for a car bed with enhanced ventilation of its internal chamber which is easily carried by a user.

Another objective is to provide a car bed affording an improved line of vision between an infant positioned therein and a driver positioned adjacent thereto.

Yet a further objective is to provide a car bed that is economical to produce and easy to install and use.

These and other objectives, which will apparent to one skilled in the art, are achieved by a preferred embodiment which is described in detail below and illustrated in the accompanying drawings.

DESCRIPTION OF THE PREFERRED EMBODIMENT

Figure 4:
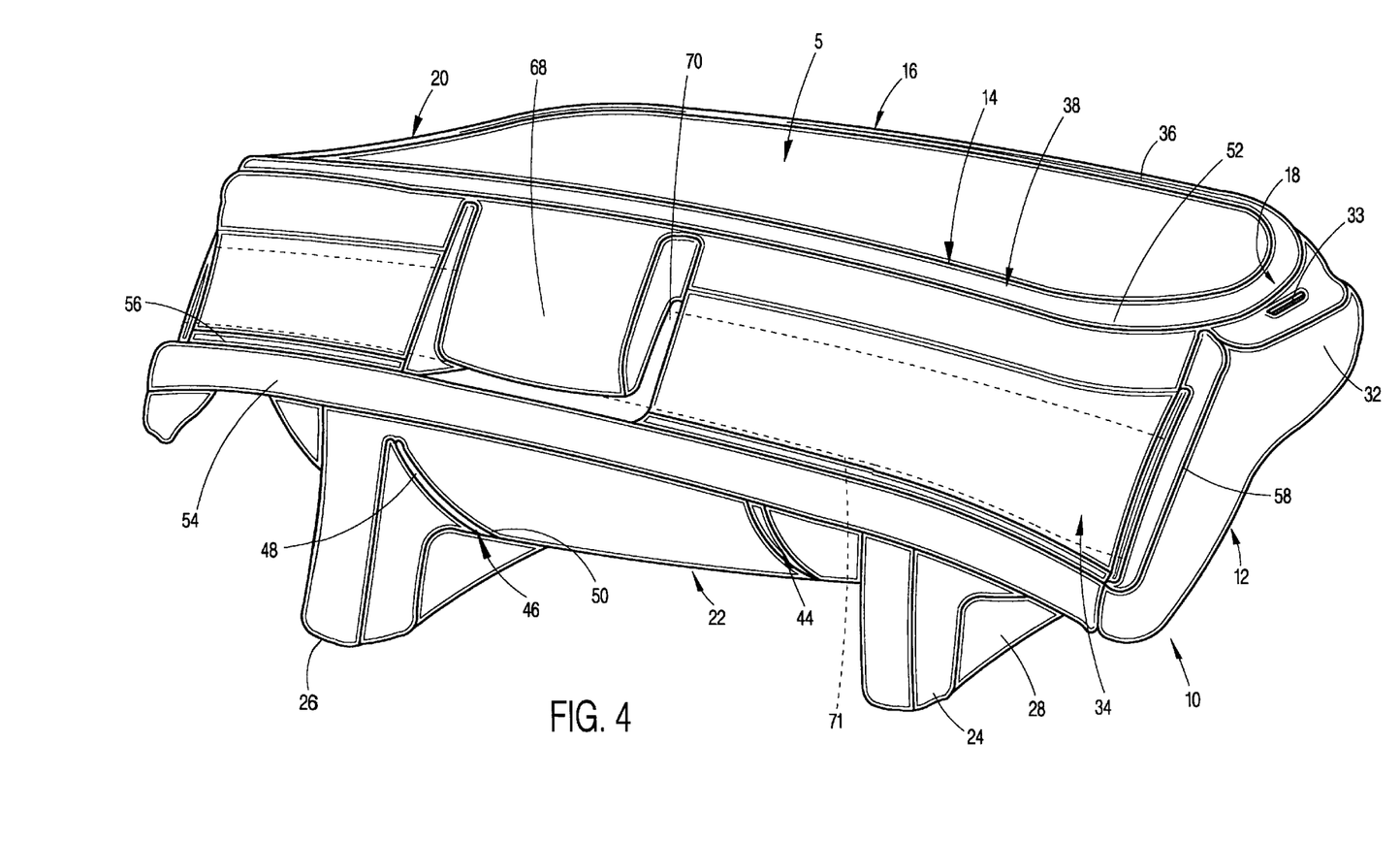
FIG. 4 is a front perspective view of the subject car bed.
Figure 7:
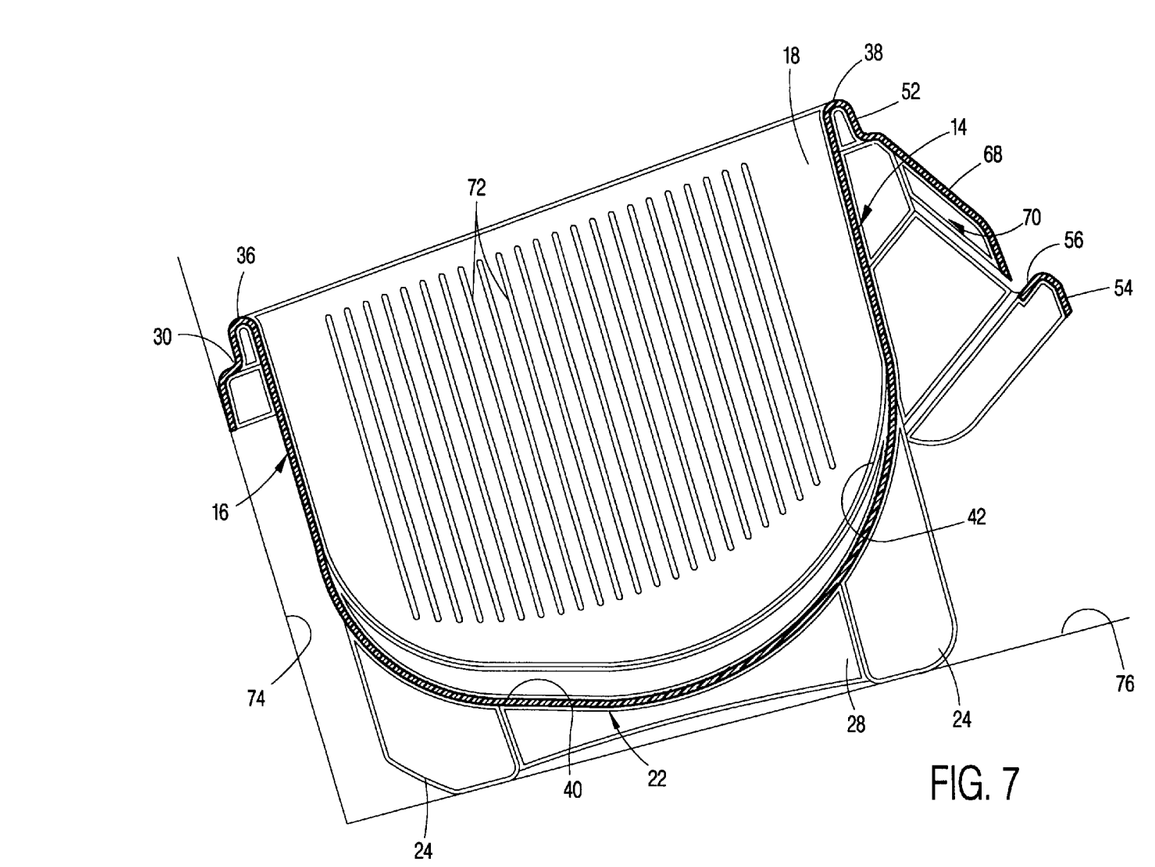
FIG. 7 is a transverse section view through the car bed shell body.

Referring initially to FIGS. 4 and 7, the subject car bed 10 is shown to comprise an integral shell body 12 that is preferably injection molded of plastic material such as polypropylene by conventional methods. The shell body includes an internal elongate chamber 5 defined by a first sidewall 14, a second sidewall 16, a first end wall 18, a second end wall 20, and bottom wall 22. Integral pairs of support legs 24,26 are molded to opposite ends of the bottom wall 22, and a molded reinforcement flange 28 extends across the bottom wall at both ends for adding strength to the structure. So configured, the shell body 12 is free standing, supported upon the legs 24,26 in an upright condition on a flat surface or, as will be explained below, upon a vehicle seat.

A downturned rim flange 30 extends the periphery of the shell body 12, forming a handle 32 along each of the end walls 18,20. A pair of slots 33 are formed through the flange handle portions 32 at opposite ends of the shell body for the purpose of receiving and connecting to a carry strap (not shown) in conventional fashion. The rim flange 30 transforms along a forward side of the shell body 12 into a skirt flange 34 which depends and flares outwardly at an acute angle of approximately thirty-six degrees from an outward surface of the first sidewall 14. The skirt flange 34 extends the length of the first sidewall 14 from the first end wall 18 to the second end wall 20.

The second sidewall 16 extends from the bottom wall 22 to an upper rim portion 36 and the first sidewall 14 extends from the bottom wall 22 to an upper rim portion 38. The rim of the shell body increases in elevation from the rim portion 36 to the rim portion 38. The first sidewall 14 is outwardly concave. A substantially planar bottom surface 40 defines the bottom of the chamber 5, and increases in elevation from end wall 18 to end wall 20, preferably in the magnitude of five degrees. A lower inward facing surface 42 of the first sidewall 14 is inwardly concave toward the chamber 5 and merges into surface 42 at the bottom of the chamber 5. The radiussed concave surface 42 and functions dually as a back rest for an infant positioned on-side, and also as a transitional surface for an infant moving in a forward direction against the first sidewall as in a collision.

With continued reference to FIGS. 4 and 7, a pair of transverse through-slots 44, 46 extend in parallel through the shell body 12. More particularly, the through-slots 44, 46 are elongate and comprise lower slot segments 50 which extend across the planar bottom surface 40 and thence upwardly across the concave surface 42, terminating at upper slot segments 48. The slots 44,46 have a width dimensioned to closely receive a harness assembly as explained below.

As will be observed, the shell body is essentially kidney shaped, with sidewall 16 curving inwardly from end to end and sidewall 14 curving outwardly. The inward curvature of the sidewall 16 is dimensioned to fit against a user's hip when the car bed is transported to and from a car. The downturned rim flange 30 intersects the sidewalls 14, 16 and end walls 18, 20 a nominal distance below upper rims 36, 38. As mentioned above, the upper rim 38 of the sidewall 14 increases in elevation around the end walls 18, 20 to merge into the upper rim 36 of sidewall 16, best viewed in FIG. 7.

Figure 6:
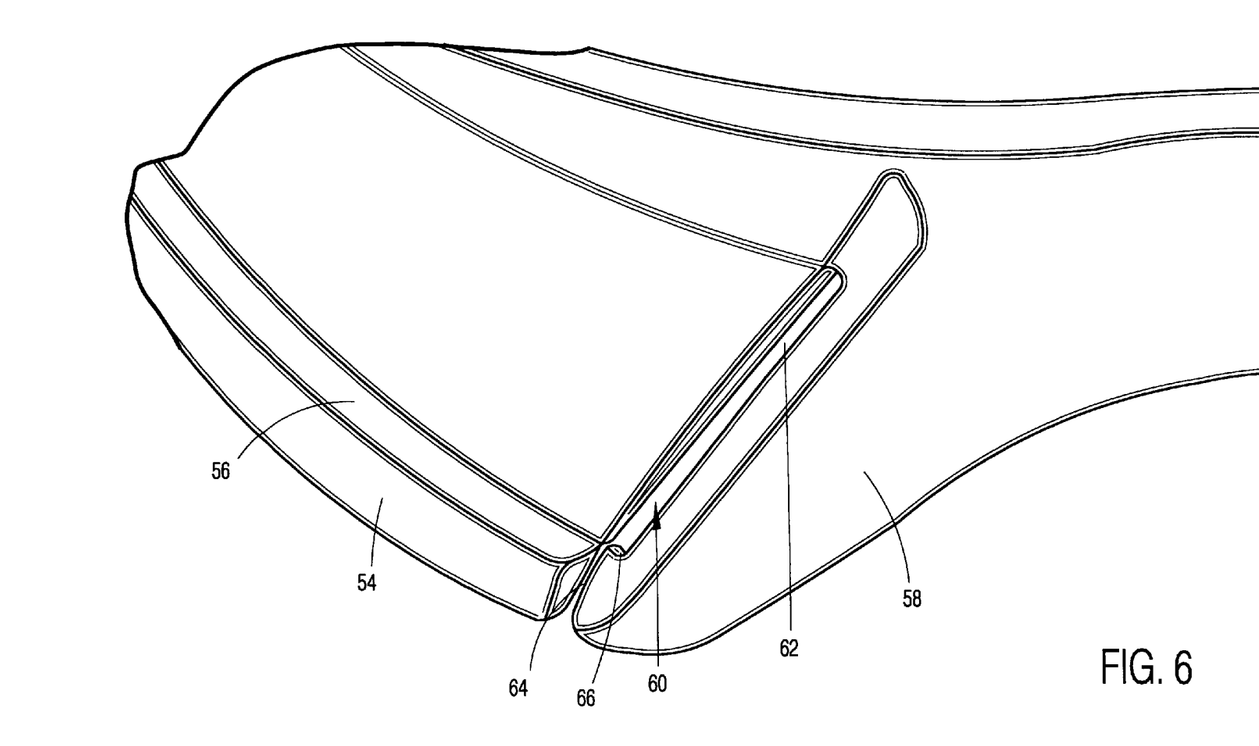
FIG. 6 is an enlarged perspective view of a corner detail of the car bed, illustrating one seat belt retention hook.

Referring now to FIGS. 4 and 6, the skirt flange 34 is arcuate in form and generally follows the contour of sidewall 14. Skirt flange 34 terminates along a lower edge flange 56 of increased sectional thickness, with flange 56 providing a handle for lifting the car bed. The lower edge flange 56 includes an upper surface 56 extending the length of the flange that serves as a lower stop for a vehicle belt. At opposite ends of the skirt flange 34, a corner hook member 58 is formed that is spaced from the skirt flange 34 by a seat belt slot 60. Slot 60 extends upwardly into the skirt flange from the lower edge flange 56 and comprises an upper slot segment 62 and a lower entry slot segment 64. A hook edge 66 is formed at the junction of lower slot segment 64 and upper slot segment 62.

Each corner hook member 58 is integrally molded with the shell body and is configured such that the lower slot segment 64 nominally has a closed, or pinched off width dimension. The upper slot segment 62 is dimensioned to accept the thickness of a conventional vehicle seat belt.

Midway across the skirt flange 34 is a third hook member 68, best seen from FIGS. 4, 6 and 7. Hook member 68 is a flange of rectilinear shape that depends downward toward and terminates proximate to the surface 56 of skirt flange 54. The hook member 68 projects outward from the plane of the skirt flange 34 such that a slot 70 is formed behind member 68.

A vehicle belt pathway 71, represented in broken line in FIG. 4, is thus defined by the outward facing surface of the skirt flange 34, and extends from the belt slot 60 of one corner hook member 58 across the skirt flange outer surface, through the slot 70 of the third hook member 68, and continuing across the skirt flange outer surface through the belt slot 60 of the opposite hook member 58. The horizontal component of the vehicle belt may be fed into the upper slot portions 62 by flexing apart the resilient plastic material defining the lower entry slot portions 64. Upon release, the plastic returns to its unstressed condition and closes off the lower entry slot portions 64, whereby capturing the vehicle belt within upper slot portions 62.

The position of the car bed upon the seat of a vehicle is represented by FIG. 7. As depicted, the flange 30 along the sidewall 16 rests against the vehicle back rest 74, while the support legs 24, 26 support the car bed on the vehicle seat surface 76. Typical vehicle seats are configured such that the vehicle seat surface 76 tilts upward from horizontal approximately fifteen degrees. The shell body, accordingly, when positioned upon a vehicle seat surface 76, tilts in a direction toward the back rest 74 and thereby orients the planar surface 40 to the bottom and curvilinear surface 42 to the front of the chamber 5.

Figure 8:
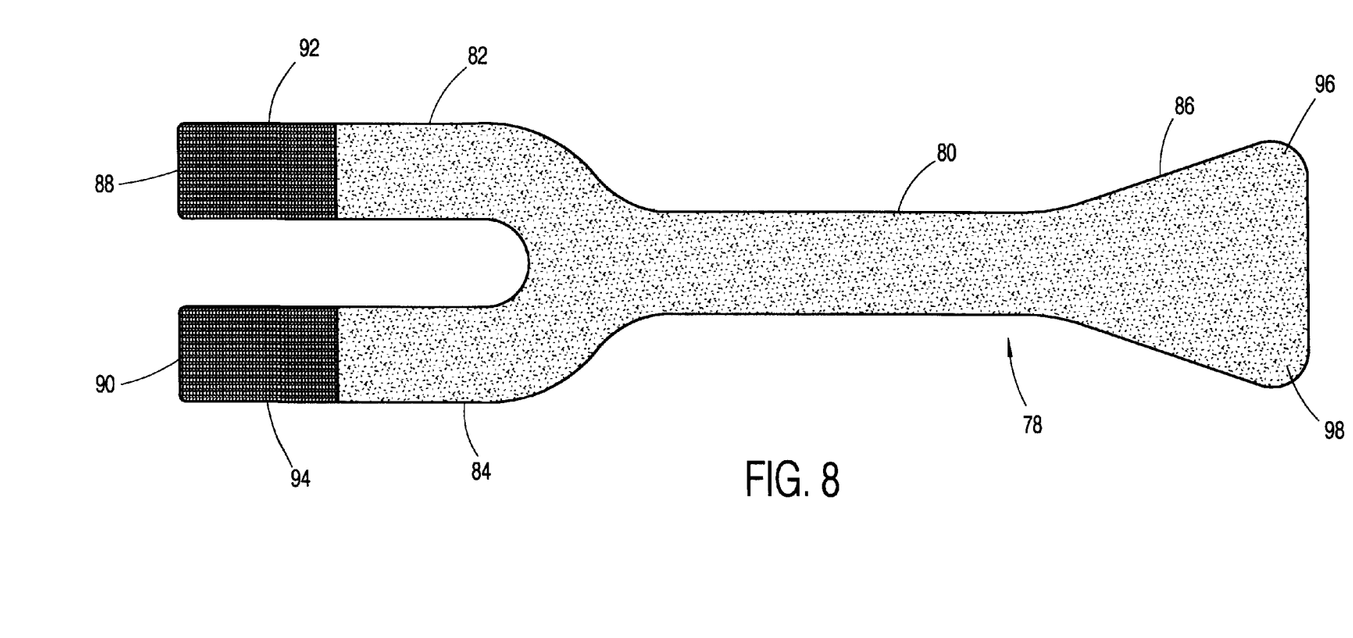
FIG. 8 is a top plan view of the harness assembly.

Referring next to FIG. 8, a Y-shaped one piece harness strap 78 is provided including a crotch strap segment 80, and two shoulder strap segments 82,84. The segments 80, 82, and 84 are joined together in a continuous strap. The crotch strap segment 80 has a free end 86 of generally deltoid configuration, and shoulder strap segments 82, 84 likewise have free ends 88, 90, respectively. The harness strap 78 is preferably fabricated in three layers. The first layer is a brushed nylon treated tricot weave, the intermediate layer is made of polyester foam, and the third layer is a nonbrushed nylon treated tricot weave. The nylon treated tricot outer layers present a surface loop configuration. Inner surfaces 92, 94 of shoulder strap segments 82, 84 are fabricated to present a hook surface configuration that engages and couples with the loop surface of the remainder of the harness on contact. A hook and loop material fastener of this general type is available commercially under the VELCRO brand name.

The free end 86 of the crotch strap 80, as described above, is of deltoid shape and includes spaced apart lobes 96, 98, each surfaced having a "loop" configuration. The surface of the deltoid end 86 of the crotch strap 80 thus will engage and couple with the hook surfaces 92, 94 upon contact. The surfaces 92, 94 can be released from the deltoid end 86 by manual separation of engaging hook and loop surfaces.

Figure 5:
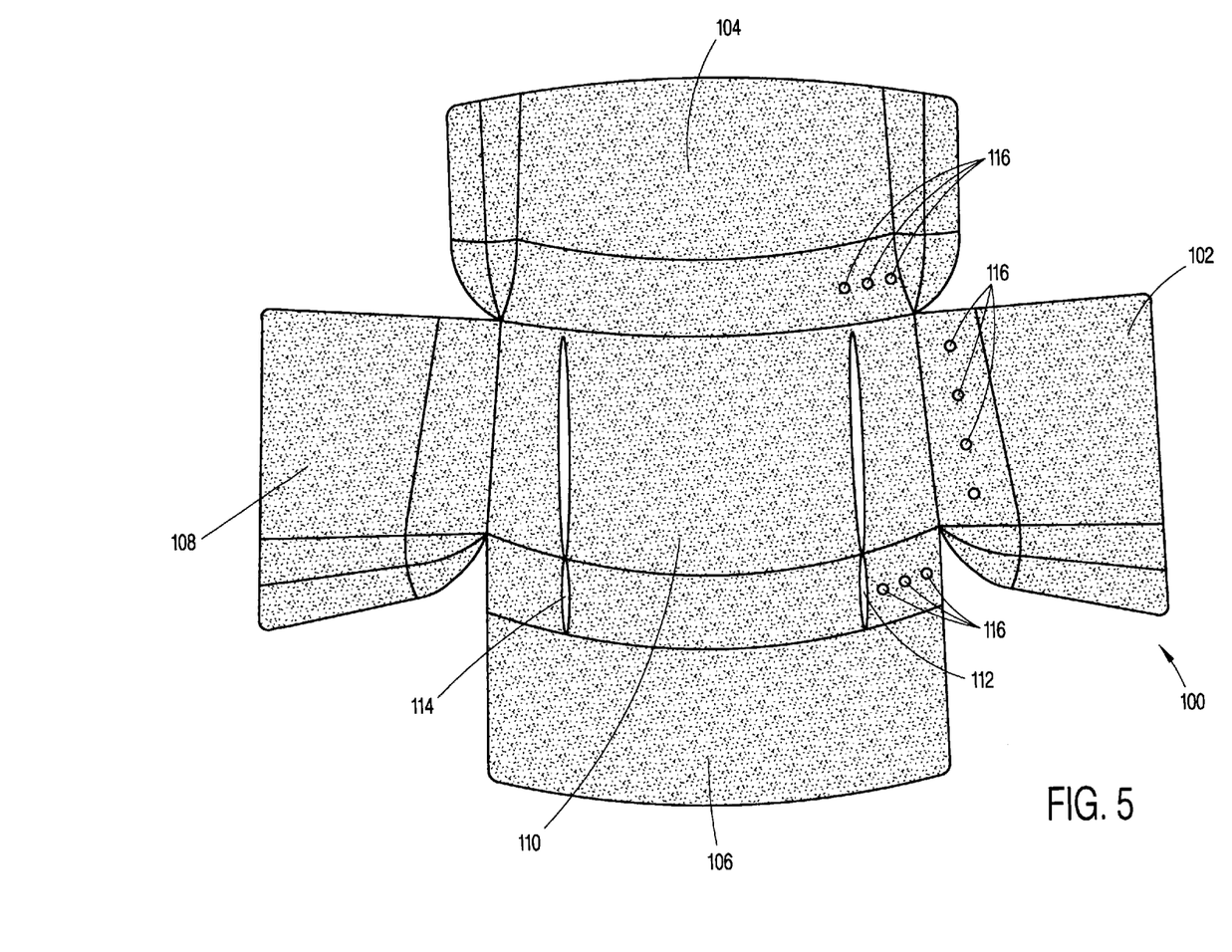
FIG. 5 is a top plan view of the pad that lines the car bed chamber.

A pad member 100 is shown in FIG. 5 to include a head flap 102, a pair of spaced apart side wing flaps 104, 106, and a foot flap 108, each flap connected along an inner edge to rectilinear bottom pad 110. Extending transversely across the bottom pad 110 and therethrough is an elongate forward lateral slot 112 and a parallel spaced apart rearward lateral slot 114. A series of ventilation apertures 116 likewise extend through the side wing flaps 104, 106 and the head flap 102. The pad member 100 is integrally formed in three layers, preferably comprising a urethane foam layer sandwiched between a layer of non-brushed nylon tricot weave and a layer of non-woven backing material.

Figure 9:
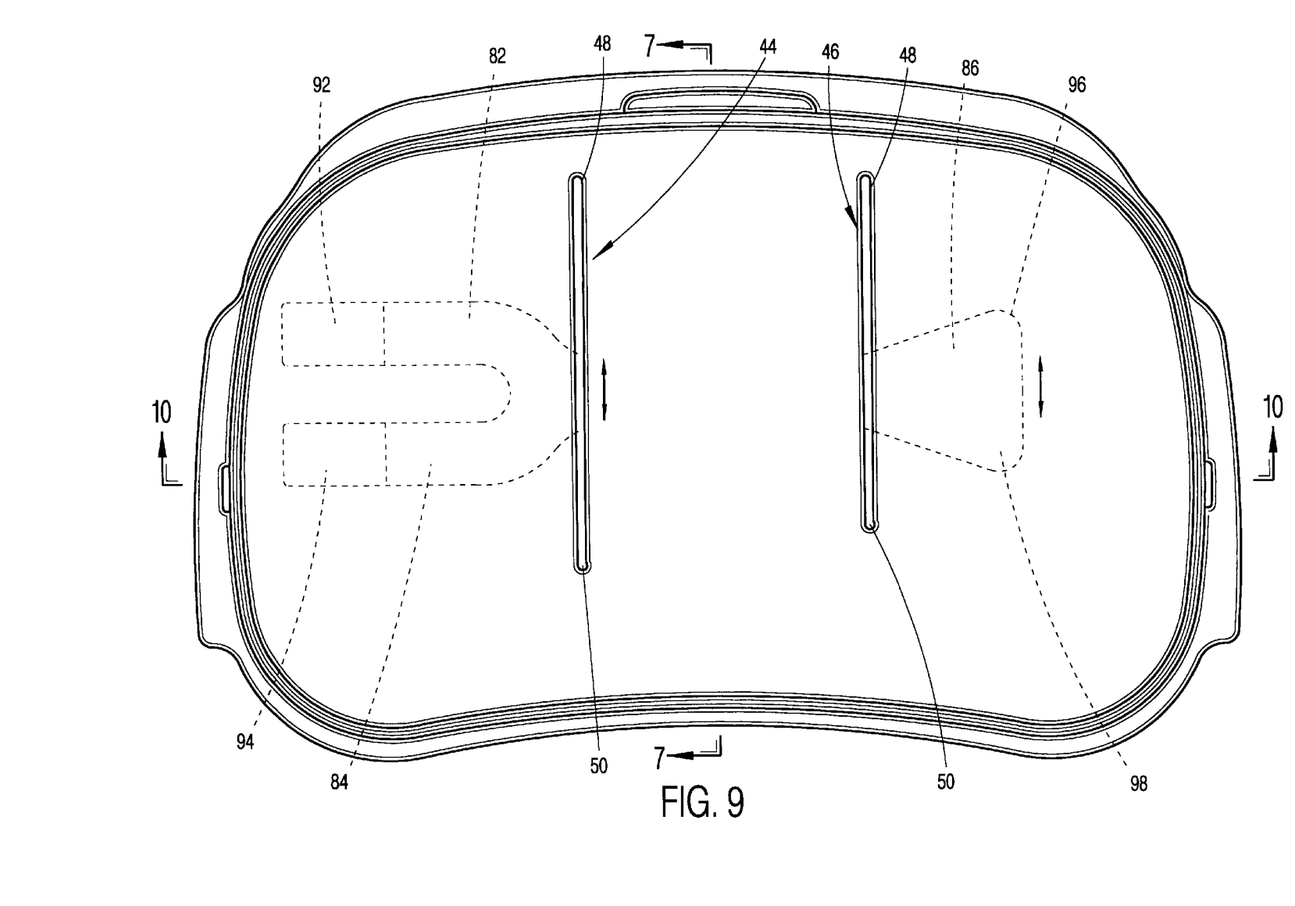
FIG. 9 is a top plan view in schematic form of the shell body showing the harness assembly extending therethrough.

Assembly of the subject car bed is initiated by aligning routing the harness 78 through the shell body as depicted in FIG. 9. The free ends of the shoulder straps 82, 84 project from an underside of the shell body through elongate slot 44 while the free end of the crotch strap 80 routes through the slot 46. It will be noted that the harness, so positioned is free to laterally move within the slots 44, 46 from lower slot segments 50 to the upper slot segments 48 in a generally curvilinear path.

The pad member 100 is thereafter inserted into the chamber 5 and folds to form fit against the sidewalls 14, 16 and end walls 18, 20, whereby padding substantially the entire interior of chamber 5. The slots 112, 114 of the pad align with the underlying slots 44, 46 of the shell body, respectively, and the harness straps 80, 82, and 84 feed through the pad slots 112, 114 in like manner. The length of pad slots 112, 114 and slots 44, 46 are substantially the same and the harness straps 80, 82, and 84 can thus laterally move to the extent previously described.

The apertures 116 of the pad member align with ventilation slots 72 in the shell body and allow air into the chamber for proper ventilation. Slots 72 in FIG. 7 are shown as extending through the end wall 18. However, similar slots are placed in sidewalls 14, 16 (not shown) are also provided that align with the apertures 116 in the pad side wing flaps 104, 106. The chamber 5 is accordingly well ventilated and air is allowed to circulate through the aforementioned apertures and ventilation slots.

Figure 1:
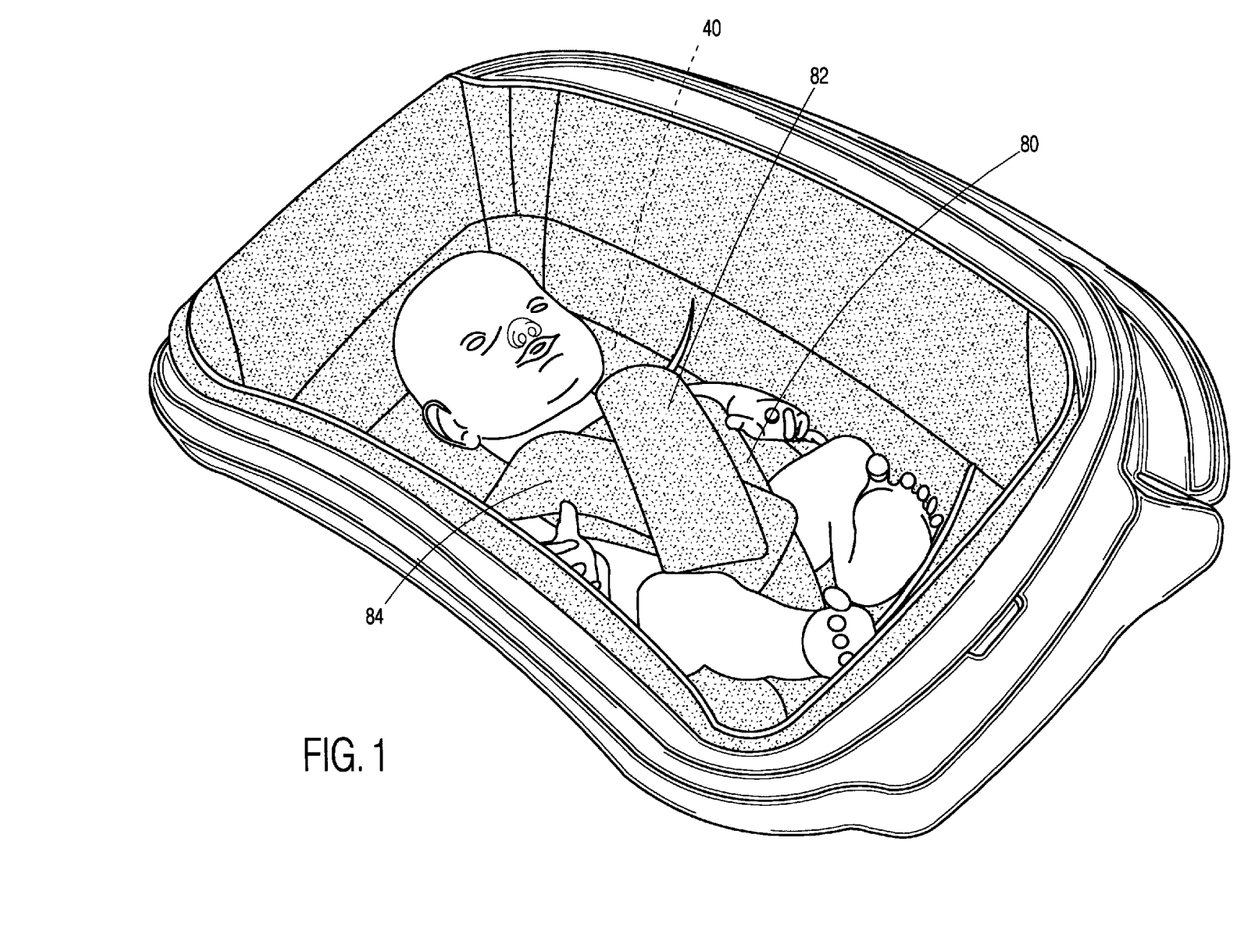
FIG. 1 is a top rear perspective view of the subject car bed, shown with an infant positioned therein in the supine position.
Figure 2:
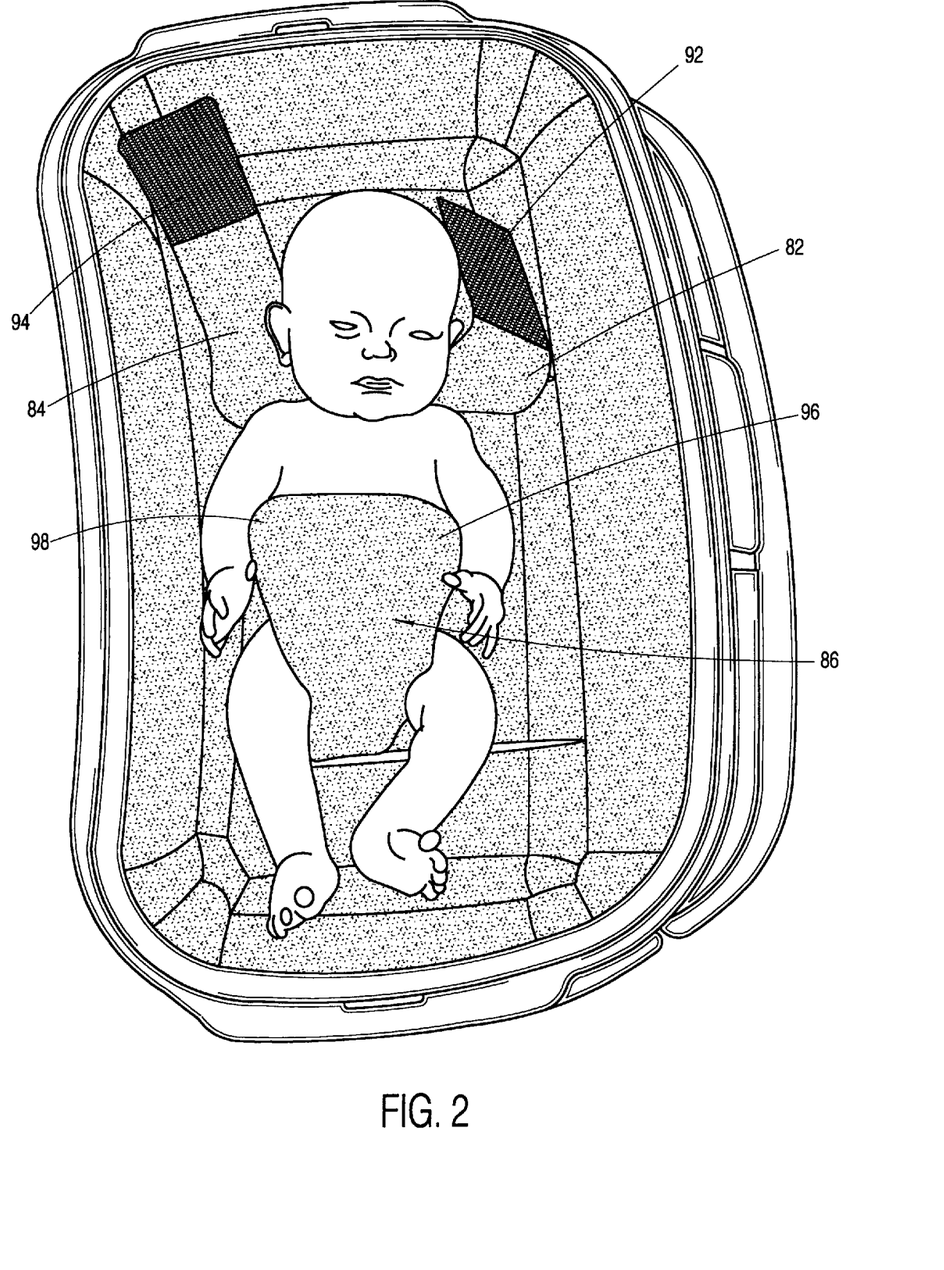
FIG. 2 is a top plan view thereof shown with an infant in the supine position and the harness assembly disattached.
Figure 3:
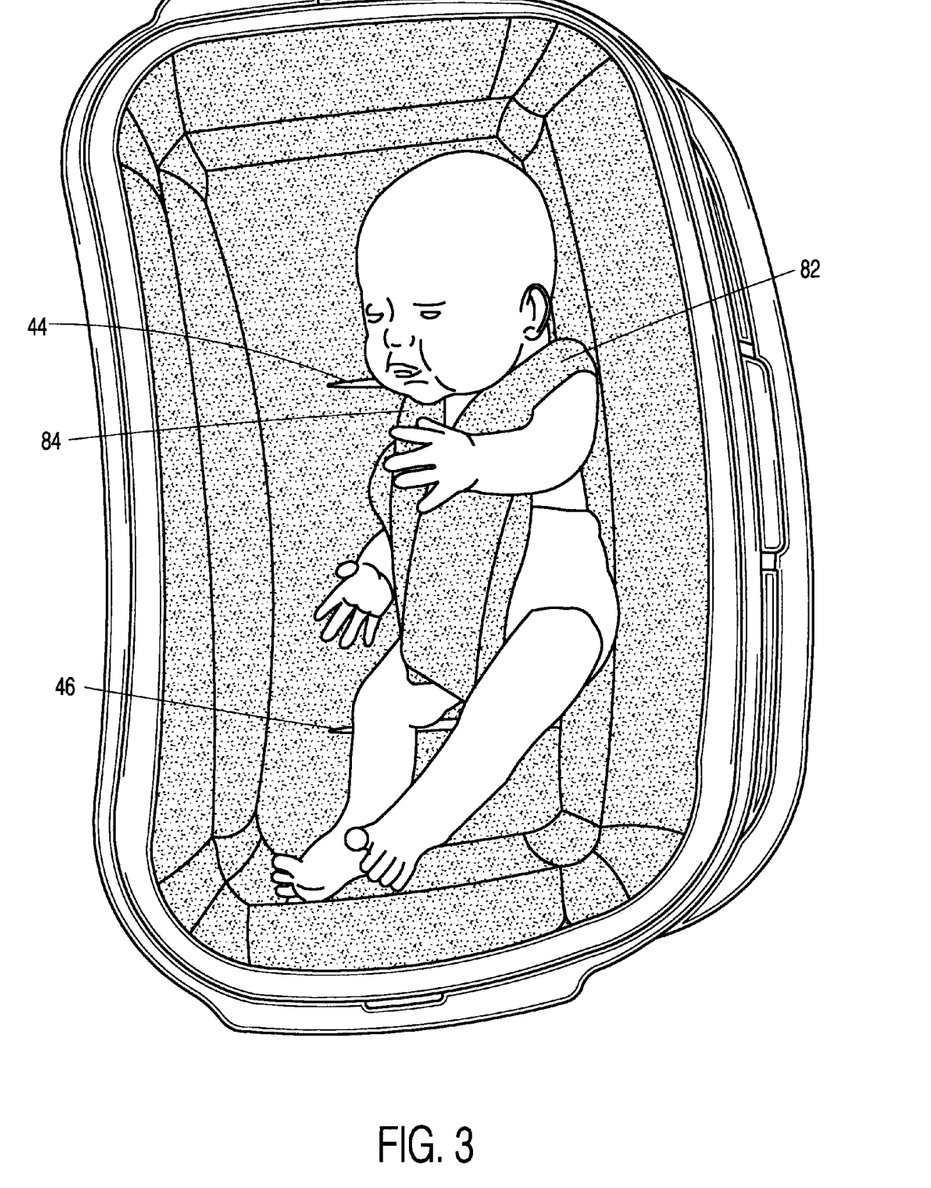
FIG. 3 is a top view thereof showing the infant in an on-side position with the harness assembly shifted laterally to correspond therewith.

FIGS. 1–3 illustrate application of the harness system to an infant. FIGS. 1 and 2 illustrate the infant in the chamber in a supine position, lying flat on the planar bottom surface of the shell body. FIG. 3 illustrates the optional on-side body position of the child and the corresponding alternative location of the harness to accommodate such a position.

Referring to FIG. 2, the infant is positioned on its back upon the planar surface of the car bed and crotch strap free end 86 is located between the child's legs. The shoulder straps 82, 84 are routed over the infant's shoulders and hook end surfaces 92, 94 are made to overlap the lobe portions 96, 98 of the crotch strap. Because the deltoid shaped free end 86 of the crotch strap is oversized, the extent of overlap between the straps 82, 84 can be varied to length or shorten the straps, thus conforming the straps to fit snugly about the infant. Thereafter, the hook surfaces 92, 94 are pressed against the loop outer surfaces of the lobe portions 96, 98 and a detachable coupling is effected. The infant is resultingly held firmly against the shell body.

It will be appreciated that the subject harness acts to secure the infant to the shell body without the use of hardware or other hard connection elements such as buckles or clasps. The soft, no-buckle harness provides a snug fit with no rigid elements, optimizing the level of comfort of the infant restrained thereby.

The supine position of the infant shown in FIGS. 1 and 2 can thereafter be changed to the on-side position depicted in FIG. 3 if so desired. Movement of the child on to the right side is permitted by the harness as straps 80, 82, 84 move laterally within their associated slots from the position shown in FIG. 9 to a position within upper slot segments 48. When rotation of the child is complete, the straps 80, 82, 84 function to snugly maintain the infant in an on-side position against the shell body. The car bed can be seen to offer the user the option of alternatively positioning the infant in the chamber on the back or on the side to suit the particular medical needs of the child. Since respiration is often facilitated by the on-side position, the subject car bed provides a distinct advantage in its body positioning alternatives.

Figure 10:
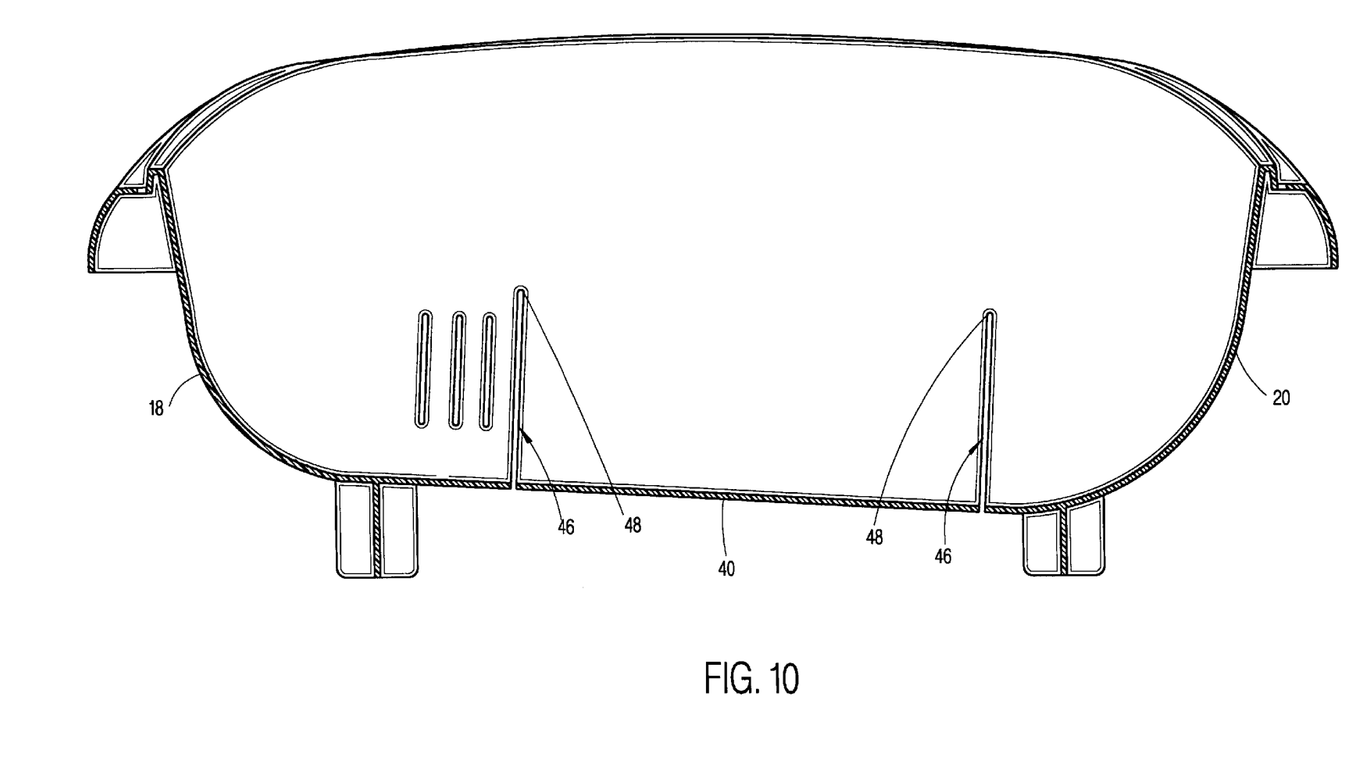
FIG. 10 is a longitudinal section view through the shell body.

As best appreciated from FIGS. 4, 7, and 10, the subject car bed is intended in use to serve as both a carrier for transporting the infant therein to and from the vehicle, and as a car bed for restraining the child while in the vehicle. To facilitate convenient transportation, the indented sidewall 16 can be positioned against the user's body and the skirt flange lower flange 54 grasped with a free hand. Alternatively, the handles 32 within flange 30 along end walls 18, 20 can be used to transport the shell body if so desired.

The subject car bed is intended to be used either on a the passenger side of a front seat or the rear passenger side or center section of a rear seat of a vehicle. In either location, the sidewall 16 positions against the backrest and the feet 22,24 upon the vehicle seat surface. So located, the child's head is orientated toward the center of the car. Moreover, the five degree inclination of bottom surface 40 within chamber 5 elevates the child's head to make the child more visible and facilitate observation of the child by the driver in transit. The inclination of the child's head can further aid respiratory and circulatory functions.

The horizontal segment of the car seat belt is routed through corner slots 60 and center slot 70 along belt path 71 as described previously. The belt path 71 is positioned proximate the upper rim of the shell body and elevates the contact line between the shell body and the car seat belt to a level above the center of gravity of the car bed. The car bed accordingly will tend to stay within the confines of the car seat belt when subjected to forward directed forces as in a crash mode. Moreover, the vehicle belt path 71 and three point retention hooks are positioned at an optimal angle and distance to the vehicle seat belt anchor to improve compatibility over the state of the art with vehicle belt systems.

The orientation of the car bed upon a vehicle seat is shown in FIG. 7. It will be appreciated that the inwardly concave surface 42 not only functions to provide a back rest for an infant placed on a side within the chamber 5, but also serves to provide a large surface area over which to distribute de-acceleration forces on the infant during a crash. Also, the concave surface 42 functions as a transition surface into the first sidewall 14. A child within the chamber 5 will move toward and against first sidewall 14 when subject to de-acceleration forces. In conventional car beds, the forward surface defining the internal chamber is a vertical wall and impact by the child thereagainst can be traumatic. With the subject invention, however, the concave surface 42 transitions the child against the forward wall, causing substantially less trauma.

Moreover, the overall low profile of the shell body upon the car seat places the infant therein at an optimal viewing angle to the driver and also keeps the car bed below the interaction zone of an airbag. The risk associated with child-impact with a deployed air bag is thus eliminated.

While the above describes the preferred embodiment of the subject invention, the invention is not intended to be so limited. Other embodiments which will be apparent to those skilled in the art and which utilize the teachings herein set forth are intended to be within the scope and spirit of the invention.

What is claimed is:

1. A restraint device for an infant comprising:
    a shell body defining an elongate chamber sized to receive the infant, the shell body including a bottom wall and first and second sidewalls;
    first and second through-slots extending through the shell body and communicating with the chamber, the through-slots each extending along a portion of the bottom wall and continuing into a lower portion of the first sidewall, said first and second through-slots being substantially perpendicular to said first and second sidewalls; and
    a harness assembly positioned in the shell body and including retention portions that extend through the through-slots, the harness assembly being adapted to secure an infant to the shell body; and
    wherein the harness assembly is laterally movable within the through-slots.

2. A restraint device according to claim 1, wherein the shell body bottom wall is substantially planar to support the infant lying in the chamber in a supine position and the first sidewall lower portion is inwardly concave and dimensioned to support the infant's back with the infant lying in the chamber on one side.

3. A restraint device according to claim 1, wherein the harness assembly retention portions comprise a crotch strap having a remote free end, and first and second spaced apart shoulder straps dimensioned in length to route over opposite shoulders of the infant, each shoulder strap including a remote free end that connects to the remote free end of the crotch strap.

4. A restraint device according to claim 3, wherein the free end of the crotch strap is deltoid in shape, comprising first and second lateral lobe portions, the lobe portions being dimensioned to contact the first and second shoulder strap free ends, respectively.

5. A restraint device according to claim 3, wherein the remote free ends of the shoulder straps and the crotch strap overlap and couple along opposed hook and loop surface portions.

6. A restraint device according to claim 5, wherein the overlap between the shoulder straps and the crotch strap remote free ends is adjustable to vary the length of the shoulder straps.

7. A restraint device according to claim 6, wherein the crotch strap and the shoulder straps are integral segments of a continuous Y-shaped strap.

8. A restraint device according to claim 3 wherein the first and second through-slots are parallel to each other; and the shoulder strap free ends project through the first through-slot and the crotch strap free end projects through the second through-slot.

9. A restraint device according to claim 1, wherein the harness assembly is laterally movable within the through-slots by an amount exceeding the width of the harness assembly into alternative locations along the through-slots to adjust a body position of the infant in the chamber, including a position in which the harness assembly extends through the bottom wall and the infant lies on the bottom wall and a position in which the harness assembly extends through the first sidewall and the infant lies with its back against the first sidewall.

10. A car bed device for an infant comprising:

a shell body defining a chamber sized to receive the infant, a bottom wall dimensioned to position the shell body on a vehicle seat, first and second spaced apart sidewalls and first and second end walls defining the chamber, each sidewall and each end wall extending upwardly from the bottom wall to a top rim and the first sidewall being generally parallel to the rear of the seat when the shell body is placed on a car seat; and a skirt flange intersecting the first sidewall proximate the first sidewall top rim, the skirt flange depending downward from and flaring outward from the first sidewall toward the bottom wall, the skirt flange defining at least one slot for receiving a seat belt of the vehicle therethrough, an outward surface of the skirt flange and the at least one slot defining a belt path, such that the seat belt attaches to the skirt flange at an attachment location proximate the first sidewall top rim and above the center of the gravity of the shell body.

11. A car bed device according to claim 10, wherein the slot comprises an slot upper segment within the skirt flange and a lower slot segment extending downward into a lower edge of the skirt flange, the upper slot segment and the lower slot segment communicating with each other.

12. A car bed device according to claim 11, wherein the skirt flange is formed of a resilient material that nonfrangably deforms to enlarge the lower slot segment to permit entry of the seat belt therein.

13. A car bed device according to claim 11, wherein the width dimension of the lower slot segment is substantially narrower than the upper slot segment.

14. A car bed device according to claim 10, wherein the skirt flange includes a plurality of retention slots within the skirt flange, the slots being positioned at spaced intervals along the belt path.

15. A car bed device according to claim 10, wherein the bottom wall of the shell body is substantially planar to support the infant lying in the chamber in a supine position and the first sidewall includes an inwardly concave lower surface facing the chamber and dimensioned to support the infant's back with the infant lying in the chamber on one side.

16. A car bed device according to claim 15, further comprising a harness assembly for restraining an infant in alternative positions within the chamber of the shell member.

17. A car bed device according to claim 16, wherein the harness assembly is attached to the shell body and comprises a crotch strap and first and second shoulder straps dimensioned in length to route over opposite shoulders of the infant in the chamber, each shoulder strap including a remote free end that connects to a remote free end of the crotch strap.

18. A car bed device according to claim 17, wherein the remote free ends of the shoulder straps and the crotch straps have overlapping and detachably contacting hook and loop surface portions.

19. A car bed device according to claim 10, wherein the bottom wall is substantially planar and is inclined in elevation from one end to an opposite end.

20. A car bed device according to claim 10, wherein the skirt flange includes a lower edge positioned for use as a handle in lifting and transporting the shell body, and the second sidewall is inwardly convex to define a depression for positioning the shell body against the infant's body.

21. A car bed device for an infant comprising:

a shell body having at least one slot therethrough and defining a chamber sized to receive the infant, a bottom wall dimensioned to position the shell body on a vehicle seat, and first and second spaced apart sidewalls and first and second end walls defining the chamber and extending from the bottom wall to a top rim, the first sidewall being generally parallel to the rear of the seat when the shell body is placed on a car seat, the first sidewall having an inwardly concave surface that faces the chamber to support the infant's back, the first sidewall increasing in height from the first end wall toward the second end wall, and, when positioned on the vehicle seat, the bottom wall increasing in elevation from the second end wall to the first end wall to elevate the infant's head with the infant positioned in a supine position in the chamber; and a harness assembly mounted through the at least one slot in the shell body to restrain an infant with the head of the infant facing the first sidewall and legs of the infant facing the second sidewall.

22. A car bed device according to claim 21 further comprising ventilation apertures through the shell body communicating with the chamber.

23. A car bed device according to claim 22 further comprising a pad member dimensioned to fit within the chamber against the bottom wall and the concave surface of the first sidewall.

24. A car bed device according to claim 23, wherein the pad member includes ventilation apertures therethrough located to align with the ventilation apertures through the shell body.

25. A car bed device according to claim 21 further comprising slots through the first end wall for reducing the rigidity of the first end wall and ventilating the chamber.

26. A car bed device according to claim 21, wherein the bottom wall has a planar surface, and the concave surface of the first sidewall merges with the planar surface of the bottom wall to transitionally support and direct the infant moving in a forward direction from the planar surface toward and against the first sidewall.

27. A car bed device according to claim 21, further comprising means for retaining a vehicle seat belt about the exterior of the shell body to hold the shell body on a vehicle seat.

28. A car bed device according to claim 21, wherein the at least one slot and the harness are arranged to restrain an infant in a plurality of positions including a first position where the infant is lying with its back oriented toward the bottom wall, a second position where the infant is lying with its back oriented toward the concave surface, and all positions between the first and second positions.

* * * * *